United States Patent [19]

Strack

[11] 4,339,420
[45] * Jul. 13, 1982

[54] PROCESS FOR THE PRODUCTION OF ZEOLITE A

[75] Inventor: Hans Strack, Alzenau, Fed. Rep. of Germany

[73] Assignees: Degussa AG, Frankfurt; Henkel Kommanditgesellschaft Akten (Henkel KGaA), Deusseldorf, both of Fed. Rep. of Germany

[*] Notice: The portion of the term of this patent subsequent to Jul. 13, 1999, has been disclaimed.

[21] Appl. No.: 237,731

[22] Filed: Feb. 24, 1981

[30] Foreign Application Priority Data

Feb. 26, 1980 [DE] Fed. Rep. of Germany ....... 3007087

[51] Int. Cl.$^3$ ............................................. C01B 33/28
[52] U.S. Cl. ..................................... 423/329; 423/328
[58] Field of Search ............................... 423/328–330; 106/288 B; 252/455 Z

[56] References Cited

U.S. PATENT DOCUMENTS

| | | | |
|---|---|---|---|
| 4,041,135 | 8/1977 | Williams et al. | 423/328 |
| 4,071,377 | 1/1978 | Schwuger et al. | 423/329 |
| 4,073,867 | 2/1978 | Roebke et al. | 423/329 |
| 4,248,847 | 2/1981 | Derleth et al. | 423/329 |
| 4,303,626 | 12/1981 | Strack et al. | 423/329 |
| 4,303,627 | 12/1981 | Strack et al. | 423/329 |
| 4,303,628 | 12/1981 | Strack et al. | 423/329 |
| 4,305,916 | 12/1981 | Strack et al. | 423/329 |

FOREIGN PATENT DOCUMENTS 2651437 5/1978 Fed. Rep. of Germany ...... 423/328

*Primary Examiner*—Edward J. Meros
*Attorney, Agent, or Firm*—Cushman, Darby & Cushman

[57] ABSTRACT

Crystalline zeolite powder of Type A is employed as a phosphate substitute in washing agents. For this use, it is advantageous if the crystalline zeolite powder of Type A has a specific average particle diameter of 4.3 to 8.5$\mu$ as well as a specifically narrow particle size distribution. By a specific sequence in the addition of the reactants in the precipitation of zeolites A this requirement of the product is fulfilled. Thereby water is present in a receiver and there are simultaneously added sodium aluminate liquor and waterglass solution and subsequently after a long stirring phase there are added further sodium aluminate liquor and further waterglass solution. The maximum grit content of the zeolite powder of Type A obtained is 0.2%.

3 Claims, No Drawings

PROCESS FOR THE PRODUCTION OF ZEOLITE A

BACKGROUND OF THE INVENTION

The invention is directed to a process for the production of crystalline zeolite powder of Type A.

Zeolite A is a crystalline alkali aluminum silicate and corresponds in its composition to the formula $$1.0 \pm 0.2\ M_{2/n}O : Al_2O_3 : 1.85 \pm 0.5\ SiO_2 \cdot y\ H_2O$$

where M is a metal cation, n its valence and y has a value up to 6.

Zeolite A in an increasing measure is important as a substitute for phosphate in washing agents. For this purpose it is desirable that the crystalline zeolite powder of Type A have the most uniform particle size possible, i.e. as narrow as possible particle size distribution curve.

SUMMARY OF THE INVENTION

The object of the invention is the development of a process for the production of crystalline zeolite powder of Type A having an average particle diameter of 4.3 to 8.5μ which is characterized by simultaneously adding to a receiver containing 8 to 10 parts by volume of water during a time span of 5 to 15 minutes with stirring at a temperature of 30° to 70° C. 2 to 8 parts by volume of sodium aluminate liquor having a concentration of 50 to 200, preferably 90 to 150 g/l of Na$_2$O and 30 to 150, preferably 60 to 100 g/l of Al$_2$O$_3$ and 0.6 to 3.5 parts by volume of waterglass solution having a concentration of 90 to 120, preferably 100 to 110 g/l of Na$_2$O and 330 to 380, preferably 340 to 370 g/l of SiO$_2$, subsequently stirring for a further 15 to 35 minutes, subsequently with stirring adding a further 8 to 26 parts by volume of the same sodium aluminate liquor during a time span of 3 to 150 minutes at a temperature of 30° to 70° C., then either simultaneously or subsequently during a time span of 3 to 60 minutes at a temperature of 30° to 70° C. adding 1.1 to 2.6 parts by volume of the same waterglass solution with stirring, subsequently stirring the entire reaction mixture at a temperature of 75° to 110° C. for 20 to 180 minutes, cooling, filtering of the crystalline reaction product and drying.

The process of the invention exhibits the advantage that within the stated region of the average particle diameter of 4.3 to 8.5μ an average particle diameter is set whereby the crystalline zeolite powder of Type A obtained has a grit content (particles greater than 45μ according to Mocker) of maximally 0.2% and a calcium binding capacity of at least 140 mg CaO/g of zeolite. The zeolite of Type A is employed as a phosphate substitute in washing agents.

The process can comprise, consist essentially of or consist of the steps set forth with the stated materials.

DETAILED DESCRIPTION

Example

There were present in a reaction vessel 10 liters of water. There was simultaneously added to the container with stirring during a time span of 10 minutes at a temperature of 38° C. 2 liters of sodium aluminate liquor having a concentration of 138 g/l of Na$_2$O and 83 g/l of Al$_2$O$_3$ and 2.5 liters of a waterglass solution having a concentration of 100 g/l of Na$_2$O and 349 g/l of SiO$_2$. Subsequently stirring was carried out for a further 30 minutes.

Then there were added at a temperature of 38° C. and under stirring a further 18 liters of sodium aluminate liquor of the same concentration during a time of 60 minutes and simultaneously a further 2.5 liters of waterglass of the same concentration as previously during a time span of 30 minutes.

Subsequently stirring was continued for a further 60 minutes at 95° C.

Then the reaction mixture was cooled and the crystalline product filtered off and dried.

The crystalline zeolite powder of Type A obtained had an average particle diameter of 6.2μ, i.e. in the particle distribution curve measured by means of the Coulter Counter the value for 50% of the particles is 6.2μ.

There was ascertained a value of 10μ in an amount of 4% by weight and for value 15μ an amount of 2% by weight.

The grit content (particle over 45μ) was according to Mocker 0.014%. The calcium binding capacity was 154 mg CaO/g of zeolite.

The entire disclosure of German priority application No. P 3007087.2 is hereby incorporated by reference.

What is claimed is:

1. A process for the production of a crystalline zeolite powder of Type A having an average particle diameter of 4.3 to 8.5μ comprising (1) having present in a container 8 to 10 parts by volume of water, (2) simultaneously adding with stirring during a time span of 5 to 15 minutes at a temperature of 30° to 70° C. 2 to 8 parts by volume of sodium aluminate liquor having a concentration of 50 to 200 g/l of Na$_2$O and 30 to 150 g/l of Al$_2$O$_3$ and 0.6 to 3.5 parts by volume of waterglass solution having a concentration of 90 to 120 g/l of Na$_2$O and 330 to 380 g/l of SiO$_2$, (3) stirring subsequently for a further 15 to 35 minutes, (4) subsequently adding with stirring during a time span of 3 to 150 minutes at a temperature of 30° to 70° C. a further 8 to 26 parts by volume of the sodium aluminate liquor of the same concentration as in step (2), (5) simultaneously with or subsequent to step (4) adding with stirring during a time span of 3 to 60 minutes at a temperature of 30° to 70° C. 1.1 to 2.6 parts by volume of waterglass solution of the same concentration as in step (2), (6) subsequently stirring the entire reaction mixture at a temperature of 75° to 110° C. for 20 to 180 minutes, cooling, filtering off the crystalline reaction product and drying.

2. The process of claim 1 wherein the concentration of the sodium aluminate liquor added in step (2) is 90 to 150 g/l of Na$_2$O and 60 to 100 g/l of Al$_2$O$_3$ and the concentration of the waterglass solution in step (2) is 100 to 110 g/l of Na$_2$O and 340 to 370 g/l of SiO$_2$.

3. The process according to claim 1 wherein there is originally present in the container 10 liters of water, step (2) is carried out during 10 minutes at a temperature of 38° C. using 2 liters of sodium aluminate liquor having a concentration of 138 g/l of Na$_2$O and 83 g/l of Al$_2$O and 2.5 liters of waterglass solution having a concentration of 100 g/l of Na$_2$O and 349 g/l of SiO$_2$, stirring in step (3) for 30 minutes, in step (4) there is added 18 liters of sodium aluminate liquor during a time of 60 minutes at 38° C. and step (5) is carried out simultaneously with step (4) but for only 30 minutes using 2.5 liters of waterglass solution and step (6) is carried out for 60 minutes at 95° C., to obtain a crystalline zeolite powder of Type A having an average particle diameter of 6.2 microns.

* * * * *